Dec. 14, 1948.  E. J. POITRAS ET AL  2,456,020
GYROSCOPE PRECESSOR AND FOLLOW-UP
Original Filed Aug. 10, 1935  3 Sheets-Sheet 1

INVENTORS
Edward J. Poitras
James D. Tear
BY
ATTORNEY

INVENTORS
Edward J. Poitras
James D. Tear
BY
ATTORNEY

Dec. 14, 1948. E. J. POITRAS ET AL 2,456,020
GYROSCOPE PRECESSOR AND FOLLOW-UP
Original Filed Aug. 10, 1935 3 Sheets-Sheet 3

INVENTORS
Edward J. Poitras
James D. Tear
BY
ATTORNEY

Patented Dec. 14, 1948

2,456,020

UNITED STATES PATENT OFFICE 2,456,020

GYROSCOPE PRECESSOR AND FOLLOW-UP

Edward J. Poitras, Pasadena, Calif., and James D. Tear, Great Neck, N. Y., assignors to Ford Instrument Company, Inc., Long Island City, N. Y., a corporation of New York Continuation of application Serial No. 35,682, August 10, 1935. This application April 11, 1939, Serial No. 267,248

15 Claims. (Cl. 74—5)

This application is a continuation of our application Serial Number 35,682, filed August 10, 1935, now abandoned.

The invention herein disclosed relates to a system and mechanism for controlling and reproducing the movements of a gyroscope, and in particular to mechanism for applying precessional forces to a gyroscope and controlling a motor to drive an object in accordance with the relative movements of a gyroscope with respect to its mounting.

In certain applications of the gyroscope, it is necessary to apply controlled precessional forces to the gyroscope and to drive an object in accordance with the movements of the gyroscope. Such mechanism must be such that there is no reaction on the gyroscope other than that intentionally effected because the gyroscope reacts to any forces applied thereto. Heretofore, various mechanisms have been utilized for accomplishing these functions, the most common being the application of precessing forces mechanically and following mechanism intermittently operated by relative movement of electrical contacts, contact between which is made and broken by relative movement of the gyroscope and the power driven gimbals.

An object of this invention is to provide a mechanism for this purpose which is more compact, smoother in operation and more satisfactory from the standpoint of performance than has, heretofore, been available. To this end, the mechanism provided includes a motor for driving a driven object in accordance with the movements of the gyroscope about an axis thereof and controls therefor which are actuated by movement of the gyroscope. In the system there is employed two such motors, one for reproducing in a driven member the movement of the gyroscope about one axis and the other for reproducing in a driven member the movements of the gyroscope about another axis at right angles to the first mentioned axis. The controls for the motors include means for exerting forces on the gyroscope to effect precession of the gyroscope.

A feature of the inventon is the fact that precession of the gyroscope is effected hydraulically.

A system embodying the invention is disclosed in the accompanying drawings in which.

General description

Figures 1, 6:
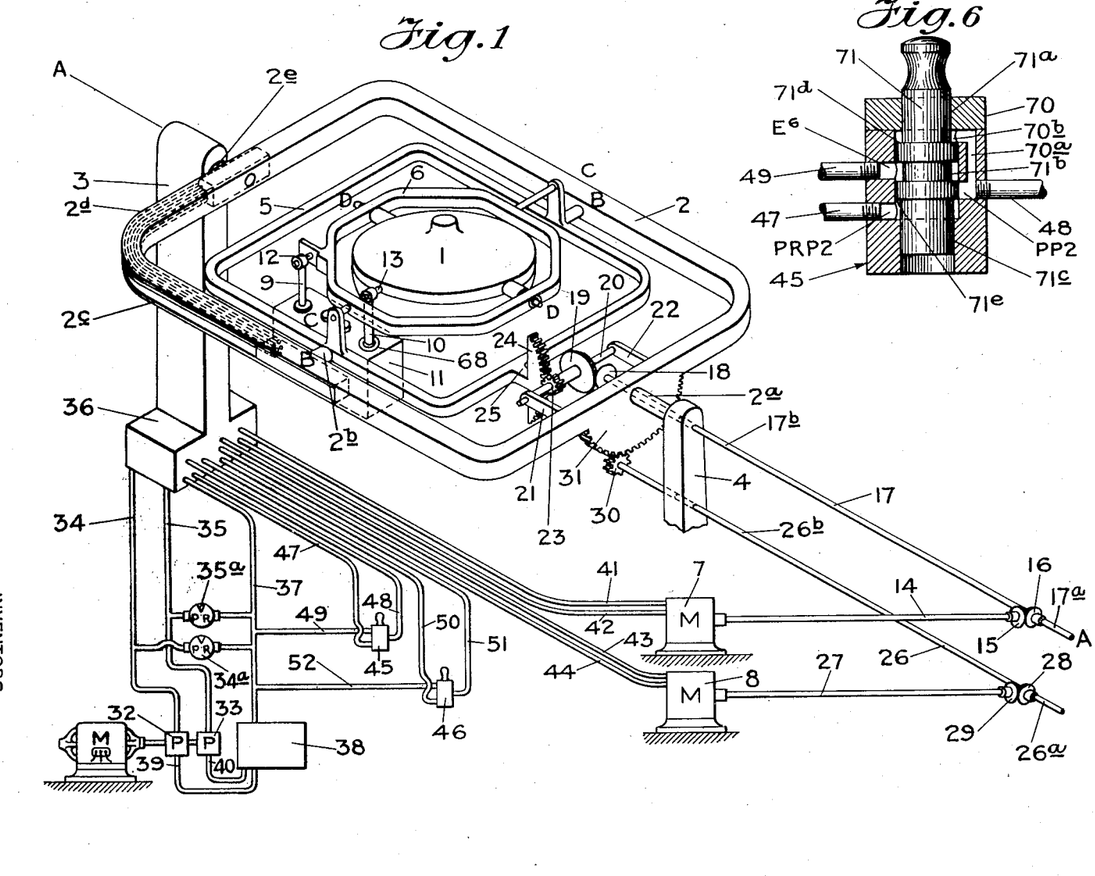
Fig. 1 is a diagrammatic representation of the system.
Fig. 6 is a longitudinal section of a force generator.
Figure 2:
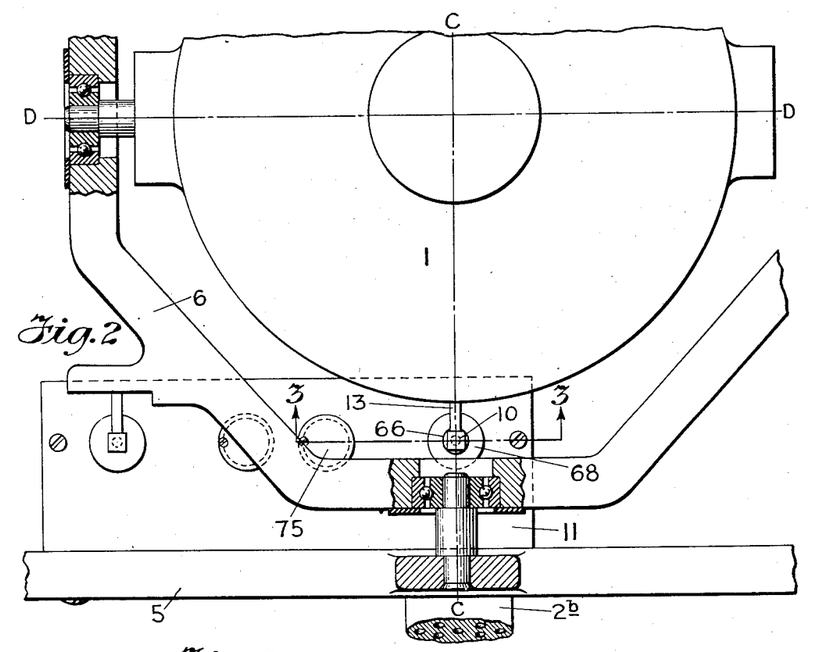
Fig. 2 is a fragmentary plan of the gyroscope mounting illustrating the control block.

In the system as illustrated in Figure 1, the gyroscope 1 is mounted in a gimbal system that is supported by a frame 2 pivotally mounted in standards 3 and 4 for oscillation about an axis A—A. Within the ring frame 2, there is mounted a phantom ring 5 for oscillation about an axis B—B at right angles to the axis A—A of the frame. A gimbal ring 6 is pivotally mounted within the phantom ring 5 about an axis C—C parallel to the axis B—B about which the phantom ring is pivotally mounted. The gyroscope proper is pivotally mounted within the gimbal ring 6 about an axis D—D perpendicular to the axis C—C about which the gimbal ring 6 is mounted. This arrangement allows free movement of the gyroscope.

The frame 2 follows the movements of the gyroscope about the axis D—D and carries the phantom ring with it in its movement about this axis. The phantom ring is driven directly to follow the movements of the gyroscope about the axis C—C, and, thus, the phantom ring follows the movements of the gyroscope about both the axis D—D and C—C. This is accomplished by hydraulic motors 7 and 8 which drive the phantom ring and the frame respectively, the operation of which motors is controlled by control elements 9 and 10 respectively, extending from a control block 11 mounted on the phantom ring 5. The control element 9 is secured to the gimbal ring 6 by a pin 12 and the control element 10 is secured to the gyroscope by a similar pin 13 so that movement of the gyroscope about the axis C—C relative to the phantom ring 5 effects movement of the control element 9 and movement of the gyroscope about the axis D—D relative to the phantom ring and frame effects movement of the control element 10.

The motor 7 is connected to a shaft 14 on the end of which there is secured a bevel gear 15. The bevel gear 15 meshes with a bevel gear 16 mounted upon a shaft 17. The shaft 17 extends through the bevel gear 16, one end 17a extending to any mechanism or apparatus that it is desired to drive in accordance with the movement of the gyroscope about the axis C—C. The other end 17b of the shaft extends through and is journaled in the standard 4 in which the frame 2 is journaled. The end 17b of the shaft extends through the center of the trunnion 2a extending from the frame 2 and journaled in the standard 4. Upon the end of the shaft, there is secured to the shaft a bevel gear 18 which meshes with a bevel gear 19 secured on a jack-shaft 20 journaled in bearing brackets 21 and 22 extending laterally from the frame 2. Secured to the gear 19, there is a pinion 23 which meshes with an arcuate rack 24 secured to a bracket 25 extending from the phantom ring 5. Through this train of gears and shafts, the motor 7 operates the phantom ring about the axis B—B.

The motor 8 drives a shaft 26 through a shaft 27 and bevel gears 28 and 29 mounted upon the shafts 26 and 27 respectively. The shaft 26 also extends through the bevel gear 28 which is secured thereon and one end 26a extends to a mechanism that it is desired to drive in accordance with the movements of the gyroscope about the axis A—A. The other end 26b of the shaft 26 extends through and is journaled in the standard 4 at a point below the shaft 17. On the end of the shaft 26b there is secured a spur gear 30 which meshes with a segmental gear 31 secured to the frame 2. Through this mechanism, the motor 8 oscillates the frame about the axis A—A.

The hydraulic medium used for operating the system is preferably oil, and oil under pressure is supplied by pumps 32 and 33, one for each of the two motors and the two control elements. The high pressure sides of the pumps 32 and 33 are connected by leads 34 and 35 respectively to a valve block 36 mounted on the standard 3. Relief valves 34a and 35a are connected to leads 34 and 35 respectively and to the exhaust line 37. The ports and passages of the controls 9 and 10 and the control block 11 communicate with the valve block 36 through ports and passages leading through the trunnion 2b which extends between the frame 2 and the phantom ring 5, the arms 2c and 2d of the frame, trunnion 2e by which the frame is pivotaly mounted in the standard 3, and the standard 3. The exhaust lead 37 extends between the valve block 36 and the oil supply tank 38 to which the pumps 32 and 33 are connected by leads 39 and 40 respectively. The motor 7 is also connected to the valve block through leads 41 and 42. Similarly, the motor 8 is connected to the valve block through leads 43 and 44.

The control elements 9 and 10 in addition to acting as control elements for controlling the operation of the motors 7 and 8, also act as precessing elements through which forces are applied to the gyroscope to effect the precession of the gyroscope. When acting as a part of the system for precessing the gyroscope, the forces exerted on the gyroscope by these elements are controlled by force generators 45 and 46. The force generator 45 is connected to the valve block by two leads 47 and 48 and to the exhaust lead 37 by a lead 49. Similarly the force generator 46 is connected to the valve block 36 by leads 50 and 51 and to the exhaust lead 37 by a lead 52.

*The motor controls*

The manner in which the various controls, force generators and valve blocks are constructed and operate is illustrated in Figures 3 to 6 inclusive. The individual controls for the motors are separate and distinct, but they are identical for the two motors. Therefore, only the control for the motor 8 will be described in detail, it being understood that the control for the motor 7 is identical in all respects. The flow of fluid to the motor 8, and, therefore, the operation of the motor, is controlled directly by a main piston valve 53 (Fig. 5) slidably mounted in the valve block 36 and the pressure of the oil supplied to the motor is regulated by a regulating valve 54 also slidably mounted in the valve block 36. The valve 53 is a four-way valve and controls the direction of the flow of oil to the motor as well as the rate of flow and thus the direction and speed of the motor. The regulating valve regulates the pressure of the oil supplied to the motor in accordance with the drop in pressure across the motor plus a constant pressure. In this way there is maintained a constant drop in pressure across the main valve and a more delicate control of the motor is assured.

Figure 5:
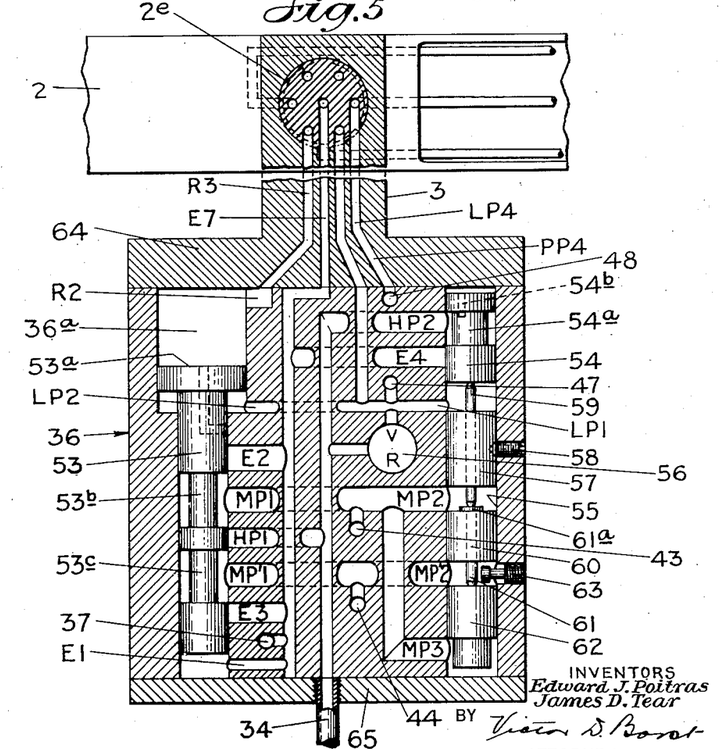
Fig. 5 represents a sectional elevation of the same.

Throughout the following description and in the drawings, the following characters and legends have been used and indicate on the drawings the interconnection of the various ports:

HP=High or pump pressure.
MP=Motor pressure.
LP=Low pressure obtained from a reducing valve 56 (Fig. 5).
E=Exhaust.
R=Reference volume.
PRP=Precessing reference pressure.
PP=Precessing pressure.

The various ports in the valve blocks are designated by the various combinations of letters above indicated and a numeral. Those ports having as a part of the designating characters one of the above combinations of letters are interconnected and are connected to the oil supply or exhaust indicated by the combination of letters.

The valve 53 is operated hydraulically, in a manner which will hereinafter be described in detail, through a piston 53a formed on the end thereof. The valve 53 has two reduced sections 53b and 53c spaced longitudinally thereof. The lower end of the valve chamber is connected through a port E1 to the exhaust lead 37 so that the valve is free to move longitudinally in the valve chamber. The valve controls communication between the ports E2 and MP1, between ports MP1 and E3, and between port HP1 and ports MP1 and MP'1. The ports MP1 and MP'1 communicate respectively with the motor leads 43 and 44; the ports E2 and E3 communicate with the exhaust lead 37 and the port HP1 communicates with the pressure lead 34. In the position illustrated in Figure 5, the valve laps the ports E2, HP1 and E3 so that when the valve is in this position the motor 8 is not operating. If the valve is moved upwardly, for example, from the position shown in Figure 5, the ports MP1 and E2 will be placed in communication and also the ports HP1 and MP'1 will be placed in communication. Oil will thus flow to the motor through the port MP'1. If on the other hand the valve 53 is moved downwardly from the position illustrated in Figure 5, the port MP1 will then communicate with the port HP1 and the port MP'1 will communicate with the exhaust port E3 and the oil under pressure will flow to the motor in the opposite direction.

The regulating valve 54 is also a piston valve and has a reduced section 54a which is adapted to control communication between the ports HP2 and E4. This regulating valve, as heretofore stated, is operated so that the pressure of the oil supplied by the pump is equal to the pressure drop across the motor plus a constant pressure so that the drop in pressure across the valve 53 is maintained constant. The relation may be indicated by the following formula:

$$HP = LP + (MPH - MPL)$$

in which HP is the working or pump pressure as regulated by the regulating valve, LP is a constant low pressure supply which is obtained by a reducing valve 56 located in the block 36, MPH is the pressure of the oil in one of the motor leads, the high pressure side of the motor, and MPL is the pressure on the other motor lead, the low pressure motor lead.

The valve 54 is actuated to provide this regulation through the mechanism illustrated in Figure 5. The valve 54 is mounted in a bore or an elongated chamber 55 of circular cross-section extending through the block 36. Below the valve, and spaced therefrom there is a block 57 secured in a definite position in the chamber 55 by a set screw 58. The block 57 is bored axially and there is a rod 59 extending through the block and slidably mounted therein. Below the block 57 and spaced therefrom there is another block 60 which is slidably mounted in the chamber 55. The block 60, like the block 57, is bored axially thereof and through this bore a rod 61 extends and is slidably mounted therein. The rod 61 is provided with an enlarged head 61a to form an abutting surface for the end of the rod 59. A third block 62 is slidably mounted in the chamber 55 and is adapted to abut against the lower end of the pin 61. Between the blocks 60 and 62 there is provided an abutment pin 63 which extends into the chamber between the blocks and prevents the block 60 from moving too far in the direction of the block 62. The slidably mounted blocks 60 and 62 act in the nature of pistons in a manner hereinafter described.

A low pressure port LPI communicates with the chamber 55 between the valve 54 and the upper end of the block 57, a port MP2 communicates with the chamber 55 between the lower end of the block 57 and the upper end of the block 60, a port MP'2 communicates with the chamber 55 between the lower end of the block 60 and the upper end of the block 62, and a port MP3 communicates with the chamber 55 below the lower end of the block 62. The block 62 has its lower end reduced as indicated so that the port MP3 will not at any time be cut off from communication with the lower end of the chamber 55. The ends of the chamber 55 are closed by the cap 64 and the bottom plate 65, which also close the ends of the chamber for the valve 53. The ports HPI and HP2 are connected through a common lead to the high pressure lead 34 of the pump 32; the port E4 is connected to the exhaust; and the port LPI is connected to the low pressure supply. The ports MPI, MP2 and MP3 are connected together and to the motor lead 43 and the ports MP'I and MP'2 are connected together and to the motor lead 44. In the valve 54 there is a passage 54b which connects the annular chamber formed by the reduced portion 54a of the valve with the valve chamber above the valve 54. Since this reduced portion of the valve is, as will be apparent from the drawing, always connected to the pressure port HP2, the pressure of the oil in this port will act against the end of the valve tending to force the valve downwardly from the position illustrated in Figure 5 and thus open the pressure port HP2 to the exhaust port E4 and lower the pressure in the pressure line to which the port HP2 is connected.

The force exerted by the oil in the chamber above the valve 54 is resisted by the pressure of the oil admitted through the low pressure port LPI and the difference between the pressure in the ports MP2 and MP'2. It will be observed that pressure of the oil in the port MP2 acts upon the block 60 tending to move the block downwardly against the pin 63. Pressure in the port MP'2 acts between the blocks 60 and 62 tending to separate these blocks and move the block 60 upwardly and the pressure of the oil admitted through the port MP3 tends to move the block 62 upwardly against pin 61. For the purpose of explaining the action of this mechanism, let us assume for the moment that MP is the pressure of the oil on the high pressure motor lead, and MP' is the pressure of the oil on the low pressure side of the motor, that is, that the valve 53 is moved downwardly from the position shown. In such an event, the pressure of the oil admitted through the port MP2 will cause the block 60 to abut against the abutment 63. The pressure of the oil admitted through the port MP'2 will act upon the end of the block 62 and the pressure admitted through the port MP3 will act upon the opposite end of the block 62. Thus, the force exerted upon the pin 61 will be proportional to the difference between the pressure of the oil admitted through the port MP'2 and the port MP3. This force will act through the rod 59 on the valve 54 and added to that force there will be the force of the oil admitted through the low pressure port LPI. The valve 54 will thus be actuated in accordance with the formula as given above.

If the main valve 53 is so operated that the port MP'I becomes the high pressure port of the motor and the port MPI becomes the low pressure port of the motor, so that the port MP'2 admits oil at the high pressure and the ports MP2 and MP3 admit oil at the pressure of the exhaust side of the motor, the valve 54 will be regulated again in accordance with the formula given above, that is, in accordance with the sum of the low pressure plus the difference between the pressure in the port MP'2 and the pressure in the port MP2. The operation will be as follows: The pressure of the oil admitted through the port MP'2 being greater than the pressure of oil admitted through the port MP3, the block 62 will be forced against the bottom plate 65 and the pressure of the oil will act to move the block 60 upwardly carrying the rod 61 and pressing against the end of the pin 59. Movement of the block upwardly will be resisted by the low pressure oil in the port MP2 so that the force on the pin 59 will be proportional to the difference between these two oil pressures and the force on the valve 54 will be the sum of this force and the force exerted by the low pressure oil admitted through the low pressure port LPI. In this manner the drop in pressure across the valve 53 between the high pressure lead of the motor and the low pressure lead of the motor, for a given torque requirement of the motor, irrespective of the direction of operation of the motor, is maintained constant. With the drop in pressure across the valve maintained constant in this way, the flow of fluid through the valve is proportional to the valve opening, and, therefore, the speed of the motor is proportional to the valve opening.

As heretofore stated, the valve 53 is operated hydraulically through the piston 53a. The piston 53a is a differential piston. The surface area of the upper side of this piston as seen in Figure 5 is approximately twice as great as that of the lower surface of the piston. Between the lower surface of the piston and the end of the chamber in which the piston operates, there is a low pressure port LP2 communicating with the chamber so that oil at a constant pressure acts upon the lower surface of the piston. That part of the chamber above the piston forms a part of a reference volume, and as will be evident, the valve may be operated by increasing or decreasing the pressure of the reference volume above or below one-half of the low pressure since the area of the piston upon which the reference volume acts is twice as large as the area upon which the low pressure acts. It is in this way that the valve 53 is operated.

Figure 3:
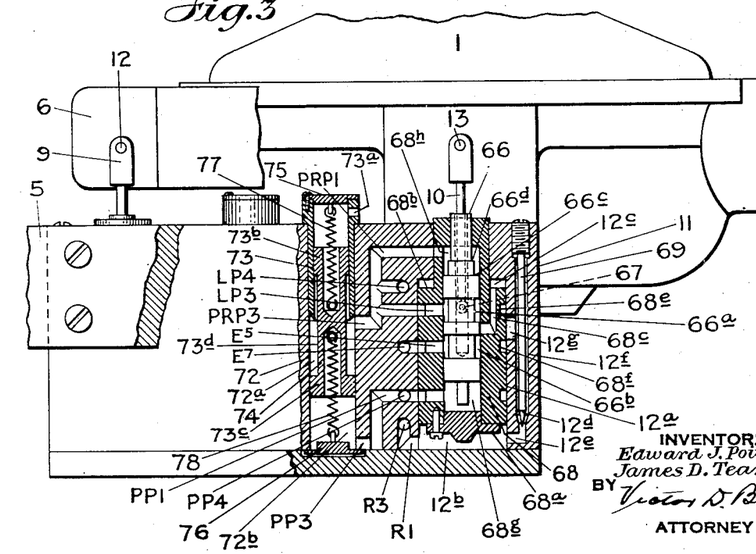
Fig. 3 is a fragmentary elevation of the gyroscope and control block, partly in section.
Figure 4:
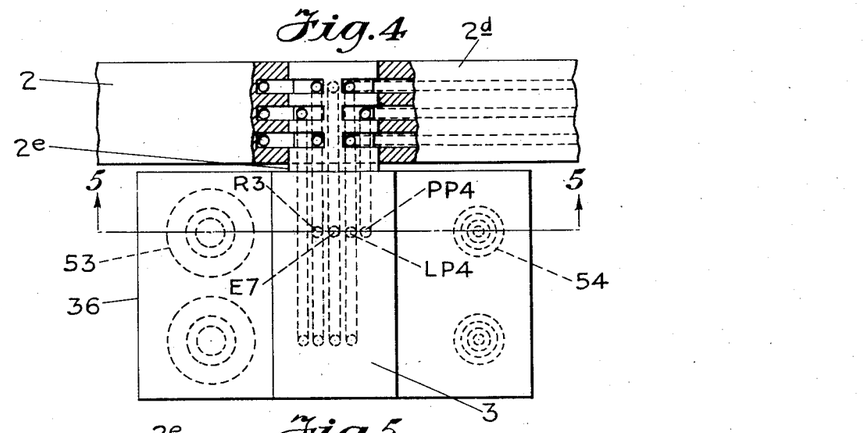
Fig. 4 is a plan of a valve block.

The pressure of the reference volume is controlled by a pilot valve 66 mounted in the valve block 11 and secured to the control element 10, which constitutes a valve stem (Fig. 3). The valve 66 is hollow for a portion of its length and the rod 10 extends into the valve and is secured therein through a pivot 67. This pilot valve is slidably mounted in a plunger 68 having ports and passages which are controlled by the valve. The valve has two reduced portions 66a and 66b spaced longitudinally thereof. The plunger 68 in which the valve 66 is slidably mounted is operated upon by differential pressures and the area of the lower surface 68a is equal to twice the area of the surface 68b. The plunger is slidably mounted in a chamber 12a formed in the valve block 11. The chamber 12b formed below the plunger 68 constitutes a part of the reference volume and communicates through a port R1 and passages R3 in the frame 2, trunnion 2e, and standard 3 with a port R2 communicating with the reference volume chamber 36a above the piston 53a in the valve block 36, (Fig. 5). It will thus be seen that movement of the plunger downwardly increases the pressure of the oil in the reference volume chamber which acts upon the larger surface of the piston 53a secured to the valve 53. Likewise upward movement of the plunger 68 reduces the pressure in this chamber. Under normal conditions with the plunger 68 and the valve 53 in the position illustrated in Figures 3 and 5, the pressure in the reference volume is one-half of the pressure of the low pressure supply.

Movement of the valve 66 admits low pressure to and exhausts low pressure from the chamber 12c formed between the upper end of the plunger and the end of the plunger chamber 12a, thus effecting either downward or upward movement of the plunger to effect the operation of the valve 53. This is accomplished through a low pressure port LP3 extending through the plunger and connected by passage LP4 through the frame 2, trunnion 2e and standard 3 with the low pressure port LP1 in valve block 36; and by an exhaust port E5 likewise extending radially through the plunger and communicating with lead 37 through passage E7 through the same ports. The valve 66 controls communication between these ports and a passage 68c which communicates with the chamber 12c. For example, if the valve 66 is moved downwardly from the position illustrated, the port LP3 is placed into communication with the passage 68c and pressure is admitted to the chamber 12c thus causing the plunger to move downwardly. On the other hand, if the valve 66 is moved upwardly from the position shown in Figure 3, the exhaust port E5 is placed into communication with the passage 68c and the pressure in the chamber 12c is reduced so that the plunger moves upwardly and the pressure of the reference volume is reduced. This arrangement provides what might be termed a power amplifying system and by means of it, the valve 53 is actuated to control the motor by an infinitesimal pressure on the valve 66. There is, therefore, practically no reaction on the gyroscope to effect the control of the motor.

In the follow-up action of the motor 8, the operation of the system is as follows: Assume that the gyroscope is moved about the axis D—D by the application of a precessing force through the control element 9 so that the valve 66 is moved downwardly. In the manner heretofore explained, oil under the low pressure is admitted to the chamber 12c and the plunger 68 moves downwardly increasing the pressure in the chamber 12b and consequently in the chamber 36a in the valve block 36. This causes the valve 53 to move downwardly from the position shown in Figure 5. Under such circumstances, as heretofore explained, the port HP1 and the port MP1 are connected together and the ports MP'1 and E3 are connected together. The regulating valve is of course functioning at all times and consequently the drop in pressure between the port HP1 and the port MP1 is constant, as explained above. The motor 8 is thus operated, and through the shafts and gears actuates the frame 2 about the axis A—A in a direction to follow the movement of the gyroscope. As the frame moves, the phantom ring also moves about the axis A—A and consequently the valve block 11 follows the movement of the valve. This is a relative movement and therefore alters the relation of the valve to the plunger. It will be understood of course that when the valve was moved the plunger moved in the same direction as the valve. In fact the difference in movement between these two elements is imperceptible. The plunger continues to move until the communication between the low pressure port LP3 and the chamber 12c is cut off. On movement of the frame, through the operation of the motor, there is the same effect as though the valve 66 were moved in the opposite direction, thus placing the chamber 12c in communication with the exhaust port E5. The pressure in the chamber 12c is thus reduced and the plunger moves upwardly until this communication is cut off at which time the operation of the motor ceases as the valve 53 is then in the position illustrated in Figure 5. The operation of the system is the same in the reverse direction.

*Synchronizing valve*

It will be apparent that in the operation of the system as described above, there will be a lag between the movement of the gyroscope and the movement of the frame. In order to remove this lag, and have the frame and the gyroscope operate synchronously, there is provided a synchronizing valve 69. The synchronizing valve 69 is a needle valve and cooperates with a valve seat 12d to control communication between a passage 12e formed in the valve block and communicating with the reference volume chamber 12b, and a passage 12f formed in the valve block 11. A port 12g extends laterally of the passage 12f. Communication between this port 12g and the low pressure port LP3 and the exhaust port E5 is controlled by movement of the plunger. The plunger has two reduced portions 68e and 68f. These reduced portions are on opposite sides of the port 12g and are such that when the plunger 68 moves downwardly, the port 12g is connected to the low pressure port LP3 and when the plunger moves upwardly, the port 12g is placed into communication with the exhaust port E5.

Thus when the plunger moves downwardly from the position shown to increase the pressure in the reference volume 12b oil under low pressure flows from the port LP3 through the port 12g, the passage 12f, valve 12d, passage 12e to the reference volume 12b and thus augments the effect of the movement of the plunger by gradually increasing the pressure in the reference volume 12b. Through the same ports and passages, when the plunger moves upwardly to decrease the pressure in the chamber 12b, the chamber 12b is placed in communication through the needle valve with the exhaust port E5 thus augmenting the effect of the plunger in reducing the pressure in the reference volume chamber 12b. The needle valve is adjusted empirically and its effect is to advance the movement of the valve 53 so that the frame operated by the motor is advanced into synchronism with the gyroscope.

The above describes the manner in which movements of the gyroscope are reproduced by the frame and any object driven by the shaft 26. In the same manner, the motor 7 is controlled to cause the phantom ring to follow the movements of the gyroscope about the axis C—C and to drive any object coupled to the shaft 17 in accordance with the movement of the gyroscope about this axis.

Precessing mechanism

The manner in which precession forces are applied to the gyroscope in this system will now be described. For each control element the precessing mechanism is also duplicated so that there is individual control for precessing the gyroscope about the axes C—C and D—D. These controls are identical and therefore there will only be described the mechanism utilized in applying a force to the gyroscope through the control element 10 to effect precession of the gyroscope about the axis C—C.

Precessing of the gyroscope about the axis C—C is effected by hydraulic pressure acting upon the valve 66 and through the valve stem creating a force on the gyroscope. For this purpose the valve 66 is reduced at 66c and 66d in diameter to form in effect a piston face equal in area to the sum of the areas of the two shoulders formed by the successive reductions in diameter. The combined area of these two shoulders is one-half of the area of the lower end of the valve which forms an end wall of a chamber 68g in the lower end of the plunger. A port PRP1 communicates with the annular chamber 68h formed in the plunger by the reduction in diameter of the valve, and a port PP1 communicates with the chamber 68g. These ports are such that irrespective of the movement of the plunger 68, they are at all times in communication with their respective chambers. The port PRP1 communicates with a supply of low pressure oil utilized as a precessing reference pressure, which may conveniently be supplied and maintained constant by the reducing valve 56 (Fig. 5) with which the port PRP1 is connected through passage LP4. The port PP1 communicates with the pressure or force generator through the lead 48 by way of passage PP4 through the frame 2, trunnion 2e, standard 3 and the connection in valve block 36.

The force generator 45 consists of a block 70 (see Figure 6) bored axially to provide a chamber for a piston valve 71. The valve 71 has three reduced portions 71a forming the stem, 71b at the approximate longitudinal center and 71c. The shoulder 71d formed by reducing the diameter at 71a constitutes a pressure face upon which the precessing pressure acts at all times; similarly the shoulder 71e formed by reducing the diameter at 71c forms a pressure face upon which the precessing reference pressure acts at all times. The force exerted upon these pressure faces are opposed; the pressure face 71d is twice the area of the pressure face 71e and the precessing reference pressure is twice as great as the normal precessing pressure. Therefore, the valve is normally balanced.

Through the block, there is formed a precessing pressure port PP2 which is connected to the precessing pressure port PP1 in the control block 11 through the pipe 48 and passages in the standard 3 and frame 2. A passage 70a connects the port PP2 with the chamber 70b formed above the shoulder 71d. The valve 71 controls communication between this port PP2 and an exhaust port E6, connected to the exhaust lead 49, and a precessing reference pressure port PRP2, connected by the lead 47 to the reducing valve 56 through which the oil under pressure for precessing the gyroscope is supplied.

From the description of the pressure faces formed on the valve 66, the interconnection of the ports to these pressure faces, and the relation of the precessing reference pressure and the normal precessing pressure, it will be apparent that in the condition of the ports illustrated in the drawings, the forces acting on the valve are equal and opposite. The precessing reference pressure is constant and the precessing pressure may be raised or lowered by manipulating the valve 71 of the force generator. For example, if a downward force is applied to the valve 71 the valve is moved downwardly from the position illustrated in Figure 6, the exhaust port E6 is connected to the port PP2 for a period such that the pressure in the PP ports and chamber 68g connected thereto is reduced by an amount to balance the force applied to the valve. The force on the upper end of the valve 66 then predominates by this amount and there is a downward precessing force on the gyroscope proportional to the force applied to the valve 71. Likewise, if an upward force is applied to the valve 71, the valve is moved upwardly, from the position illustrated, the port PRP2 is placed in communication with the port PP2 until the pressure in the ports PP and the chamber 68g is increased an amount to balance the force applied to the valve. The force acting on the lower end of the valve 66 then predominates and there is an upward precessing force applied to the gyroscope proportional to the force exerted on the valve 71.

It is important to note that there is no movement of the valve 66 under the action of these unbalanced forces, for in accordance with the phenomena of the gyroscope, the gyroscope precesses about an axis at right angles to the axis about which the precessing force tends to rotate the gyroscope, i. e. in this instance the application of a force through the valve 66 will cause the gyroscope to rotate about the axis C—C, and similarly a force exerted by the element 9 and tending to rotate the gyroscope about the axis C—C, will cause the gyroscope to precess about the axis D—D.

It should also be observed that the construction and arrangement of the force generator is such that when not actuated manually or when the valve 71 is not acted upon by some external force, it places the system in equilibrium. For example, if the pressure in the port PP2 is less than one-half of the pressure in the port PRP2, then the valve 71 will be moved by the superior force of the pressure of the oil in the port PRP2 to open the port PRP2 to the port PP2 until the pressure of the oil in the port PP2 is sufficient to balance the force exerted by the oil in the port PRP2 and close the valve. Likewise, if the pressure of the oil in port PP2 is more than half the pressure of the oil in the port PRP2, the valve will be moved downwardly to open the port PP2 to the exhaust until the forces on the valve 71 are balanced, at which time the forces on the valve 66 are balanced.

*Relief device*

For the purpose of avoiding large instantaneous flows of oil in the precessing and precessing reference pressure lines, upon rapid movement of the valve 66, and to relieve sudden pressures which otherwise might be created in these lines, as for example, when the gyroscope is rotating about the axis D—D, there is provided variable volume chambers 72a and 72b in the control block 11. These chambers are formed in a bore 72 in the control block by a sleeve 73 and a differential, slidably mounted piston 74. The sleeve 73 makes a snug fit in the bore and extends into the bore from the upper end thereof to a point approximately at the longitudinal center of the bore, the upper end of the sleeve extends above the control block and a cap 75 covers the end thereof. The upper end of the sleeve is however open to the atmosphere through an opening 73a in the wall thereof. A cap 76 closes the lower end of the bore in which the sleeve is mounted. The piston 74 has hollow ends and it is normally centerd in the bore by centering springs 77 and 78 each secured to the piston at one end; the springs extend in opposite directions and have their other ends secured in the caps 75 and 76. One part 73b at the upper end of the piston slides in the sleeve and another part of the piston 73c slides in the bore below the sleeve. The parts 73b and 73c are joined by a reduced portion 73d of the piston 74 which forms shoulders of differential areas, the effective area of the shoulder on the part 73b being one-half of the area of the shoulder on the part 73c.

A port PRP3, which is connected to port PRP1 by a passage in the control block, and to port PRP2 in the force generator 45 by passage LP4 and lead 47, communicates with the annular chamber 72a formed by the reduced section of the piston. Another port PP3, connected to the port PP1 by a passage in the control block and to the port PP2 by passage PP4 and lead 48, communicates with the chamber 72b below the lower end of the piston. When the system is in equilibrium, the piston 73 is centered and balanced because the pressure of the oil in the port PRP3 acts upon an effective surface of one-half the area on which the oil in the port PP3 acts. If the equilibrium of the system is disturbed, however, as for example, by upward movement of the valve 66 from the illustrated position, the chamber 72a expands to offset the contraction of the chamber 68h. Also, the chamber 72b contracts to offset the effect of the expansion of the chamber 68g. Conversely, if the valve is moved downwardly from the position illustrated, the chamber 72a contracts and the chamber 72b expands. Whenever during operation, there is a net precessing force on the piston valve 66, the piston 74 has a net force applied to it and assumes a position other than central, determined by this net force and the spring gradient. The movement of the valve is thus effected without appreciably disturbing that portion of the system through which the precessing forces are applied to the gyroscope irrespective of the position of the piston 74.

Thus there is provided by this invention a system associated with a gyroscope functioning both as a follow-up to control a servo-motor responsive to relative movement of the gyroscope, and as a means for applying precession forces on the gyroscope, the follow-up being effected smoothly and without appreciable reaction on the gyroscope.

It will be obvious that various changes may be made by those skilled in the art in the details of the embodiment disclosed in the drawings and described in detail above within the principle and scope of the invention as expressed in the appended claims.

We claim:

1. In a gyroscope precessing and following mechanism, a gyroscope, a pivotally mounted support therefore having a piston compartment thereon and ports in the walls thereof, a compound differential piston slidably mounted in said compartment in control of said ports and connected to said gyroscope, a source of liquid under constant pressure acting on one end of the piston, a source of liquid under variable pressure acting on the other end of the piston, and means for varying the pressure of said last mentioned source of liquid to vary the precessing force on the gyroscope.

2. In a gyroscope precessing and following mechanism, a gyroscope, a pivotally mounted support therefore having a piston compartment thereon and ports in the walls thereof, a power motor, means connecting the ports to the motor, a motor operating pressure medium communicating with said ports, means connecting the motor, to the support for actuation of the support by the motor, a differential piston control element for controlling the operation of the motor slidably mounted in said piston compartment and connected to said gyroscope, a source of liquid under constant pressure acting on one end of the piston, a source of liquid under pressure communicating with the compartment at the opposite end of the piston, means for varying the pressure of said last mentioned source of liquid to vary the precessing force on the gyroscope, and valve means operated by the piston control element for controlling the ports and thereby controlling the operation of the motor.

3. In a gyroscope precessing and following mechanism, a gyroscope, a support therefore mounted for pivotal movement about two axes at right angles to each other, the support having a piston valve compartment and ports in the walls thereof, a hydraulic motor responsive to relative movement of the gyroscope and support about one axis, means for connecting the motor to the support for actuation of the support by the motor, a differential piston valve in the valve compartment and connected to the gyroscope, the valve controlling the interconnection of the ports of the valve compartment, means for effecting the operation of the motor upon relative movement of the valve and valve compartment, a source of liquid under constant pressure communicating with the compartment to act on one end of the piston valve, a source of liquid communicating with the compartment to act on the other end of the valve, and means for varying the pressure of said last mentioned source of liquid.

4. In a gyroscopic mechanism, a gyroscope, a support therefore, a hydraulic motor, and means for controlling the operation of the motor including a hydraulically operated valve for controlling the flow of fluid to the motor, a closed system including a hydraulic medium acting on said valve, and means for varying the pressure in said closed system in accordance with the relative movements of the gyroscope with respect to its support.

5. In a gyroscope precessing and following mechanism, a gyroscope, a supporting structure therefore including a fixed support, a member pivotally mounted on said fixed support, a second member pivotally mounted on said first member at right angles to the pivotal axis of the first member, a piston compartment including valve ports in said fixed support, a second piston compartment mounted on one of said members, motors for driving said members in accordance with the relative movement of the gyroscope and the fixed support, means for operatively connecting the motors to the members, a piston in said first named compartment adapted to cooperate with said valve parts, a piston in said second named compartment operable by the relative movement of said gyroscope for controlling the operation of said first named piston, and means controlled by the relative movement of said first piston and said valve ports for controlling the operation of one of said motors.

6. In a gyroscope precessing and following mechanism, a gyroscope, a support therefor including two members pivotally mounted upon axes at right angles to each other, a valve compartment mounted on one of said members, two valves in said compartment and connected to said gyroscope for applying precessing forces to the gyroscope about axes at right angles to each other, two hydraulic motors each connected to drive one of said members, an oil supply and means for supplying said oil under pressure to said valves and motors, means intermediate said pressure means and said valves for varying the pressure on said valves to selectively operate said valves to apply precessing forces on said gyroscope to effect precession thereof, and means operable by the movement of the gyroscope relative to the members controlling the operation of the motors for driving said members.

7. A gyroscopic precessing and following mechanism comprising a pair of standards, a frame member pivotally mounted on the standards, an outer gimbal ring within the frame pivoted to the frame on an axis at right angles to that of the frame, an inner gimbal ring pivoted to the outer gimbal ring on an axis parallel to that of the outer gimbal ring, a gyroscope pivoted within the inner gimbal ring on an axis at right angles to that of the inner gimbal ring, gear means for actuating the frame about its pivotal axis, a hydraulic motor operatively connected to the gear means, and a hydraulic system for controlling the motor including a main valve block having control ports therein, leads providing communication between certain of the ports and the motor, means for providing a hydraulic medium under pressure to the valve block, a piston valve in the valve block in control of the ports, a control member operatively attached to the gyroscope, hydraulic means responsive to the control member for controlling the piston valve, and hydraulic means for exerting a force on the control member and thereby applying a precessing force to the gyroscope.

8. A gyroscopic precessing and following mechanism comprising a pair of standards, a frame member pivotally mounted on the standards, an outer gimbal ring within the frame pivoted to the frame on an axis at right angles to that of the frame, an inner gimbal ring pivoted to the outer gimbal ring on an axis parallel to that of the outer gimbal ring, a gyroscope pivoted within the inner gimbal ring on an axis at right angles to that of the inner gimbal ring, gear means for actuating the frame about its pivotal axis, a hydraulic motor operatively connected to the gear means, and a hydraulic system for controlling the motor including a main valve block having control ports therein, leads providing communication between certain of the ports and the motor, means for providing a hydraulic medium under pressure to the valve block, a piston valve in the valve block in control of the ports, a control member operatively attached to the gyroscope, a control valve block mounted on the outer gimbal ring, a control valve in the control valve block operatively connected to the control member, a hydraulic column operatively connecting the control valve and the piston valve, and hydraulic means for exerting a force on the control member and thereby applying a precessing force to the gyroscope.

9. A gyroscopic precessing and following mechanism comprising a pair of standards, a frame member pivotally mounted on the standards, an outer gimbal ring within the frame pivoted to the frame on an axis at right angles to that of the frame, an inner gimbal ring pivoted to the outer gimbal ring on an axis parallel to that of the outer gimbal ring, a gyroscope pivoted within the inner gimbal ring on an axis at right angles to that of the inner gimbal ring, gear means for actuating the frame about its pivotal axis, a hydraulic motor operatively connected to the gear means, and a hydraulic system for controlling the motor including a main valve block having control ports therein, leads providing communication between certain of the ports and the motor, means for providing a hydraulic medium under pressure to the valve block, a piston valve in the valve block in control of the ports, a control valve block mounted on the outer gimbal ring having ports communicating with the main valve block, a compound control valve in the control valve block comprising an outer tubular slide valve controlling certain of the ports and operative to control the piston valve, means for providing a normally balanced hydraulic pressure on opposite ends of said outer slide valve, an inner slide valve operative to vary the hydraulic pressure on one end of the outer slide valve, means for providing a normally balanced hydraulic pressure on opposite ends of the inner slide valve, and means for varying the pressure on one end of the inner slide valve; and a control member operatively connecting the inner slide valve and the gyroscope.

10. In a gyroscope precessing and following mechanism, a gyroscope, a pivotally mounted support therefor having a piston compartment thereon and ports in the walls thereof, a compound valve slidably mounted in said compartment comprising an outer tubular valve controlling certain of said ports, means for providing a normally balanced hydraulic pressure on opposite ends of said outer valve, an inner valve slidable in the outer valve and operative to vary the hydraulic pressure on one end of the outer valve, means for providing a normally balanced hydraulic pressure on opposite ends of the inner valve, means for varying the pressure on one end of the inner valve, and a control member operatively connecting the inner valve and the gyroscope.

11. In a gyroscope precessing and following mechanism, a gyroscope, a pivotally mounted support therefor having a piston compartment thereon and ports in the walls thereof, a compound valve slidably mounted in said compartment comprising an outer tubular valve controlling certain of said ports, means for providing a normally balanced hydraulic pressure on opposite ends of said outer valve, an inner valve slidable in the outer valve and operative to vary the hydraulic pressure on one end of the outer valve, means for providing a normally balanced hydraulic pressure on opposite ends of the inner valve, means for varying the pressure on one end of the inner valve, a control member operatively connecting the inner valve and the gyroscope, and means operative to relieve unbalanced pressure on opposite ends of the inner valve when it is moved by the gyroscope.

12. A gyroscope precessor and follow-up, comprising a frame mounted to tilt about an axis, a phantom ring mounted in said frame to tilt about an axis at right angles to the aforesaid axis, a gimbal ring mounted in said phantom ring to tilt about an axis parallel to the said axis of the phantom ring, a gyroscope mounted in said gimbal ring to tilt about an axis parallel to the axis of said frame, respective hydraulic means to tilt said frame and said phantom ring about their respective axes, and means controlled by said gyroscope and said gimbal ring to energize said hydraulic means proportional to and upon tilt of said gyroscope about the said axes at right angles relatively to said frame and phantom ring whereby to cause said frame and phantom ring to follow the movements of said gyroscope about said axes respectively.

13. A gyroscope precessor and follow-up, comprising a frame mounted to tilt about an axis, a phantom ring mounted in said frame to tilt about an axis at right angles to the aforesaid axis, a gimbal ring mounted in said phantom ring to tilt about an axis parallel to the said axis of the phantom ring, a gyroscope mounted in said gimbal ring to tilt about an axis parallel to the axis of said frame, respective means to tilt said frame about its axis and to tilt said phantom ring about its axis in said frame, and respective means controlled by movement of said gyroscope about its axis in said gimbal and movement of said gimbal about its axis in said phantom ring to actuate said respective tilting means proportionately to and upon said movements of said gyroscope and said gimbal ring relatively to said frame and phantom ring whereby to move said frame and phantom ring in correspondence with the movements of the gyroscope and the gimbal ring respectively.

14. In a gyroscope precessing and follow-up mechanism, a pivotally mounted support, a gyroscope pivotally mounted on the support, a cylindrical valve compartment mounted on the support, a hydraulic motor for positioning the support, a compound valve in the compartment comprising an outer valve movable to control the operation of the motor and an inner valve movable in the outer valve to control the movement of the outer valve, means for generating a pair of normally balanced pressures for applying a pair of normally balanced forces to the inner valve, means for varrying one of the pressures to unbalance the forces applied to the inner valve, and a control member operatively connecting the inner valve and the gyroscope.

15. In a gyroscope precessing and follow-up mechanism, a support pivotally mounted on mutually perpendicular axes, a gyroscope pivotally mounted on the support on corresponding mutually perpendicular axes, two valve compartments mounted on the support, two hydraulic motors operably connected for positioning the support about each of its respective mounting axes, a compound valve in each compartment comprising an outer valve movable to control the operation of a respective motor and an inner valve movable in the outer valve to control the movement of the respective outer valve, means for generating two pair of normally balanced pressures for respectively applying a pair of normally balanced forces to each inner valve, means for varying one of the pressures of each pair of pressures to unbalance the forces applied to the respective inner valves, and two control members connecting the respective inner valves to the gyroscope whereby the inner valves are moved by movement of the gyroscope relative to the support about the respective axes and the unbalanced forces applied to the inner valves are applied as precessing forces acting about the respective axes of the gyroscope.

EDWARD J. POITRAS.
JAMES D. TEAR.

REFERENCES CITED

The following references are of record in the file of this patent:

UNITED STATES PATENTS

| Number | Name | Date |
| --- | --- | --- |
| 1,826,013 | Meredith | Oct. 6, 1931 |
| 1,984,874 | Gillmor et al. | Dec. 18, 1934 |
| 2,087,961 | Anscott | July 27, 1937 |
| 2,093,503 | Wittikuhns et al. | Sept. 21, 1937 |